Patented Jan. 7, 1941

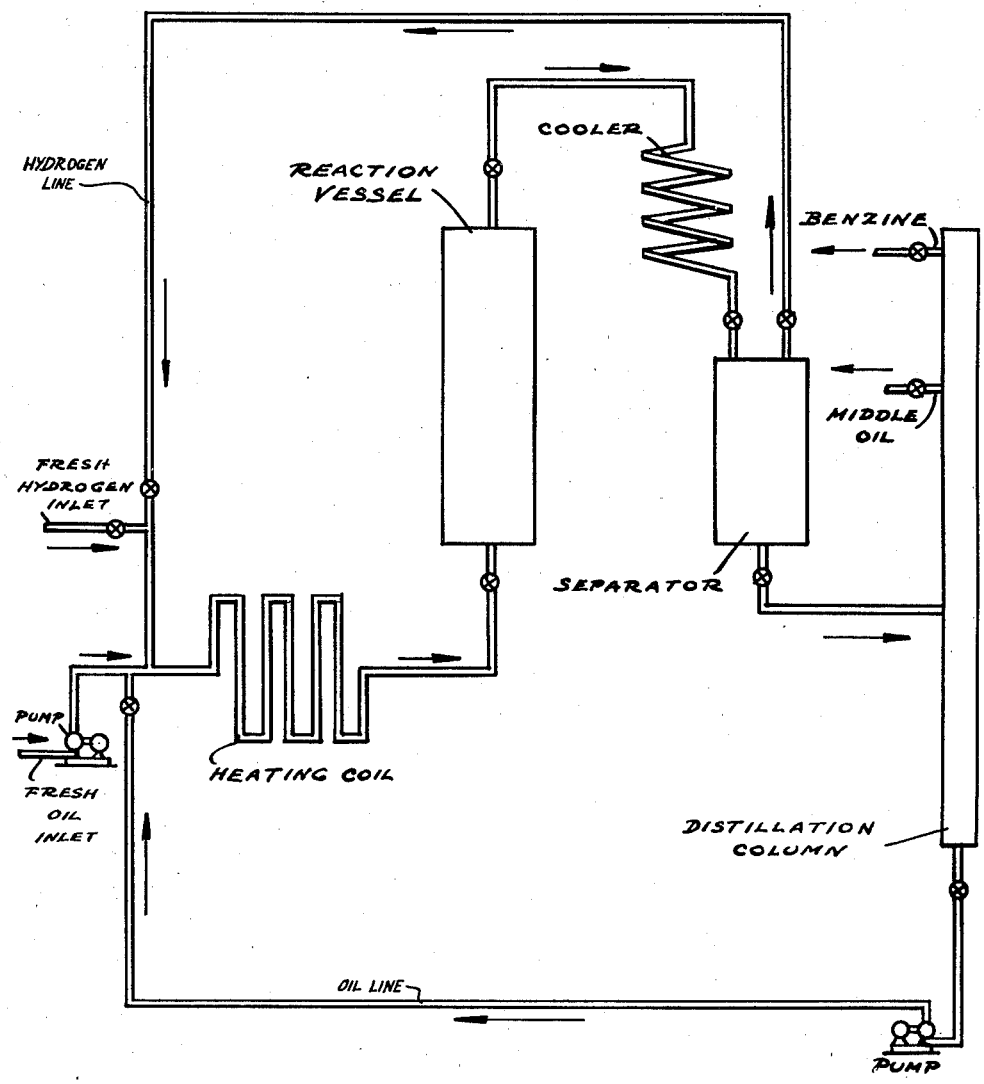

2,227,671

UNITED STATES PATENT OFFICE 2,227,671

PROCESS FOR THE PRODUCTION OF VALUABLE HYDROCARBON PRODUCTS BY TREATMENT OF CARBONACEOUS MATERIAL WITH HYDROGENATING GASES

Mathias Pier, Heidelberg, Walter Simon, Ludwigshafen-on-the-Rhine, and Ernst Donath, Mannheim, Germany, assignors to Standard-I. G. Company, Linden, N. J., a corporation of Delaware Application May 28, 1937, Serial No. 145,398
In Germany May 30, 1936

1 Claim. (Cl. 196—53)

The present invention relates to improvements in the production of valuable hydrocarbon products, in particular, motor fuels such as benzine, Diesel oil and the like, by treatment of liquid or fusible carbonaceous materials containing asphalt at high temperatures and under pressure with catalysts.

Hitherto in the aforesaid process when treating initial materials containing asphalt in substantial amounts, the usual procedure was to disperse finely divided catalysts in the initial material. In this way it was possible to treat initial materials of this type even though the asphalt rather soon adversely affected the activity of the catalysts, because fresh catalysts could be continuously introduced so that active catalyst was always present in the reaction space. This method of working is however attended by several disadvantages, viz. it is not always easy to recover the spent catalyst, and the recovery of catalyst is in any case an operation bringing with it extra expenses. Furthermore special attention must be given to the introduction of said finely divided catalyst continually throughout the entire operation and the concentration of catalyst in the reaction space cannot be maintained very high. Furthermore it is not always easy to maintain a uniform concentration of finely divided catalyst throughout the reaction space.

All of the aforesaid difficulties and disadvantages can be avoided by working with a stationary catalyst, over which the reagents are continuously passed. In this case the proportion of catalyst to reagents in the reaction space can be very high. When it is ultimately decided to recharge the reaction vessel with catalyst the losses in catalyst material are negligible, and the catalyst removed from the reaction space can be recuperated substantially quantitatively.

However, hitherto in industrial operation when directly treating with hydrogenating gases liquid or fusible carbonaceous materials containing asphalt in considerable proportions it was not possible to take advantage of the amenities of working with catalyst stationarily contained in the reaction space, since the catalyst once charged into the reaction space did not exercise its function for long periods of time, say several months or more, without considerable decrease in activity. It was therefore hitherto considered necessary to carefully free these materials from asphalt, for example, by distillation in vacuo or refining with selective solvents, adsorption agents or chemical condensing agents prior to treating the initial materials for the production of valuable hydrocarbon products by passing them together with hydrogenating gases over stationary catalysts, even catalysts of rather high activity such as heavy metal sulphides.

We have now found that liquid or fusible carbonaceous materials containing between 2 and 50 per cent by volume of asphalt (determined according to the propane-method) can be successfully converted into valuable hydrocarbon products by direct treatment with stationary catalysts if they are passed together with hydrogenating gases as a temperature of between 300° and 500° centigrade over a catalyst of at least standard hydrogenating activity as defined below while maintaining such a hydrogen partial pressure of at least 250 atmospheres, at which the activity of the catalyst does not substantially decrease.

A catalyst has at least the standard hydrogenating activity specified herein if it is capable of bringing per litre of reaction space and per hour at least 150 litres and preferably at least 250 litres or more of hydrogen into reaction under the following conditions:—

A middle oil boiling between 200° and 325° centigrade and having a specific gravity of 0.840, which is obtained from mineral oil by distillation, if necessary followed by an extraction treatment, is passed together with hydrogen under a pressure of 200 atmospheres over the catalyst to be tested which is stationarily contained in the reaction space, the throughput being adjusted at 1.5 kilogram of oil per litre of catalyst and per hour and 3 cubic metres of hydrogen measured under normal conditions of temperature and pressure being introduced per kilogram of oil. Under these conditions as a rule 0.5 to 1 kilogram or more of benzine are formed per hour and per litre of catalyst.

As examples of catalysts which answer to this test may be mentioned some heavy metal compounds, for example, sulphides of tungsten, molybdenum, vanadium and rhenium, or the oxides of these metals, in particular sulphides of tungsten and molybdenum, if specially prepared, for example, as described in U. S. Patents Nos. 2,038,599, 2,039,259, 1,955,629 and British Patent 455,313 and these are of special advantage in the process in accordance with the present invention. Also mixtures of catalysts may be applied, for example mixtures of the said sulphides or oxides with compounds of metals of the 2nd and 3rd group, excepting the compounds of calcium, barium and strontium. Also catalysts on carriers may be applied with great advantage, for example, on active carbon or bleaching earths, in particular bleaching earths which have been prepared with fluorine or hydrofluoric acid.

The propane-method for the determination of the asphalt content of the initial material is carried out as follows:—

A certain volume of the initial material is treated in a closed vessel with 3 to 6 times its volume of liquefied propane at about 60° centigrade and under a pressure only slightly above the vapour pressure of propane at this temperature. The asphalts are thus precipitated and two layers are formed. The asphalts are separated and the volume thereof determined.

The volume of asphalt thus determined is calculated as a percentage of that part of the initial materials boiling above 325° centigrade.

The percentage of propane asphalt is always at least 10 per cent larger than the amount of asphalt, commonly known as hard asphalt, (calculated on the hard asphalt) and determined in the usual manner (see Holde, Kohlenwasserstofföle und Fette, 6th edition, pages 106–107). For asphalt base mineral oils and tars the propane asphalt content is at least two times the hard asphalt content.

As initial materials coming into question, for treatment according to the present invention, may be mentioned mineral oils, tars, products obtained by destructive hydrogenation or extraction of coals, for example bituminous coal or browncoal, peat, oil shales and the like, containing substantial amounts of asphalt, and, in particular, materials containing at least 25 per cent of constituents boiling above 350° centigrade, such as heavy oils of the said type or materials containing such heavy oils in considerable amounts.

If the initial materials contain more than 50 per cent of asphalt determined according to the propane-method, it has been found that these materials are unsuitable for direct treatment in accordance with the present invention, and therefore their content of asphalt must be reduced to below 50 per cent. Suitably the asphalt content should not exceed 40 per cent and preferably not 30 per cent, since also with initial materials containing above 30 per cent of asphalt a reduction of the asphalt content is sometimes desirable. However, also materials containing more than 40 per cent of asphalt, however, less than 50 per cent may be employed, as an example of which may be mentioned many cracking residues. Initial materials containing more than 50 per cent of asphalt may in part be freed from asphalt so that the asphalt content measured according to the propane-method is brought below 50 and preferably below 40 or 30 per cent or they may be diluted with an oil poor in asphalt. Distillation may be resorted to for the production of these fractions of reduced asphalt content, but preferably such fractions are used as are obtained with the aid of selective solvents such as hydrocarbons of rather low boiling point. It is not necessary nor desirable to employ for this purpose the lowest boiling hydrocarbons such as ethane and propane since the production of products entirely free from asphalts is not aimed at. Most suitable for the purpose are saturated hydrocarbons containing from 4 to 10 carbon atoms in the molecule, but hydrocarbons containing more carbon atoms or other selective solvents may also be employed. It may be desirable to apply in addition to said selective solvents a good solvent for resins and asphalts such as phenols and the like to improve the selective separation of asphalts. The content of asphalt in such initial materials may also be reduced in the desired degree to below 50, 40 or 30 per cent by subjecting them to a hydrogenation under mild conditions with finely divided, for example, pulverulent catalysts. Such a pretreatment is also desirable in case the hydrogen content of the initial material is very low, for example, below 6 to 8 per cent, dependent on the origin of the initial materials. It is desirable that the initial materials treated according to the present invention contain at least 8 per cent, preferably at least 10 per cent of hydrogen.

To assure practical success in the process according to the present invention it is desirable that the initial materials contain as little solid matter such as ash constituents and unconverted coal particles, as possible. The content of solid constituents, in particular, ash constituents should be less than 0.01 per cent since these may sedimentate in the reaction vessel and other parts of the plant thereby causing disturbances in operation, and they may also cause a decrease in catalyst activity.

Solid matter is removed by mechanical means, for example, by centrifuging or by filtration, if desired, in the presence of adsorbents. The filtration or centrifuging may be carried out in dilution with oils which may be derived from the process itself and which it is desired to recycle to the process.

The process according to the present invention is usually a destructive hydrogenation and more particularly benzines, Diesel oils or gas oils and in some cases lubricating oils are produced. The process according to the present invention may also be employed for hydrofining or hydrogenating initial materials of the said type.

As a rule it does not matter greatly whether the initial materials treated in an upright reaction vessel flow from the bottom to the top or from the top to the bottom. If the content of solid constituents in the initial material is high, say about 0.01 per cent and/or if the content of asphalts is high it is advisable to pass the initial material through the reaction vessel from the top to the bottom. The hydrogen may be passed in co-current or countercurrent flow with the initial materials.

We have found according to the present invention that there is a minimum hydrogen partial pressure for each initial material and set of reaction conditions at and above which no substantial reduction in the activity of the catalyst takes place in a period of at least a week. By this is meant that after one week of operation, all conditions being maintained the same, the content of hydrogen of the obtained liquid products is not substantially less than at the commencement of the week. Below this minimum hydrogen pressure a more rapid decrease in catalyst activity takes place. In order to be assured of industrial success the process according to the present invention should be carried out with at least this hydrogen partial pressure or a higher partial pressure. As a rule it is not necessary to work at a hydrogen pressure exceeding said minimum partial pressure by more than 20 per cent.

The total pressure applied may be 30 to 100 atmospheres higher than the hydrogen partial pressure.

We have found that said minimum hydrogen pressure is dependent on the content of asphalt in the initial materials although the figure is also influenced by other considerations. In general when treating initial materials with more than 10 per cent of asphalt a hydrogen partial pressure of at least 300 atmospheres is employed. With initial materials containing more than 20 per cent of asphalt, a hydrogen partial pressure of at least 400 atmospheres and with materials containing more than 30 per cent of asphalt a hydrogen pressure of at least 475 atmospheres is employed. For example, we have found the following relationships for many mineral oils, the asphalt contents being as always in the present specification determined according to the propane method.

| Asphalt content | Minimum hydrogen partial pressure |
| --- | --- |
|  | Atmospheres |
| 2 per cent | About 300–350. |
| 2–10 per cent | About 350–420. |
| 10–20 per cent | About 420–500. |
| 20–30 per cent | About 500–600. |

The above relationships cannot of course be taken as a hard and fast rule and deviations therefrom will occur owing to differences in the nature of the initial materials, in the nature of the asphalts, the catalysts employed and the reaction conditions. With oils or tars produced by low temperature carbonisation or destructive hydrogenation of coal, for example, a higher minimum hydrogen partial pressure for a given asphalt content will be required than that indicated above.

In order to assure success in industrial working it is therefore necessary to determine in each case by preliminary tests the requisite minimum hydrogen partial pressure at which no substantial decrease in catalyst activity takes place in one week. A series of preliminary tests is therefore carried out with progressively increasing pressures of 250, 300, 350, 400, 450, 500, 550, 600, 650, 700, 750 atmospheres and so on. In practice one will start in the preliminary tests with a minimum hydrogen pressure indicated in the above-mentioned table, for the corresponding content of asphalt as determined by the propane-method.

The series of preliminary tests with progressively increasing hydrogen partial pressures are usually carried out by passing the initial material at a temperature of about 410° centigrade with a rate of flow of 0.5 kilogram of oil per litre of catalyst and per hour while adding 2 cubic metres of hydrogen measured under normal conditions of temperature and pressure per kilogram of oil and the amount of hydrogen brought to reaction is determined in each case at the commencement and at the end of the week of operation for each test. The minimum hydrogen partial pressure which has thus been determined or a higher pressure, preferably a hydrogen pressure not exceeding said minimum pressure by more than 20 per cent is then employed in industrial operation with said catalyst stationarily contained in the reaction vessel and said initial material.

The process may be carried out in the liquid or gas phase. The throughputs are taken in accordance with the desired splitting action between 0.2 and 1 kilogram or more of oil per litre reaction space per hour. An advantageous manner of operation is to pass the material first over strongly hydrogenating but non-splitting catalysts (such as tungsten disulphide and nickel sulphide) and then over splitting catalysts (such as tungsten disulphide). It may also be advantageous to have present in the same reaction vessels besides stationary catalysts some finely divided catalyst dispersed in the material or to add promoting substances.

The process is carried out with hydrogen or gases containing sufficient free hydrogen. The gases may contain as admixtures carbon monoxide, carbon dioxide, hydrogen sulphide, methane and the like, the amounts of which are suitably adjusted. The amount of hydrogen used is suitably at least one cubic metre per kilogram of oil, for example, 2 to 3 cubic metres. Also hydrogen in statu nascendi may be used, provided however, that the production thereof does not disturb the hydrogenation reaction.

In accordance with the present invention it is easily possible to produce in continuous industrial operation from liquid or fusible initial materials containing large amounts of asphalt for example 30, 35 and up to 50 per cent as a maximum, high yields of lower boiling hydrocarbons corresponding to those otherwise obtained with initial materials which have been purified with the attendant expenditure and work.

The drawing is a diagrammatic illustration of suitable equipment for carrying out the process of this invention and indicates the flow of material.

The following example will further illustrate how the present invention may be carried out in practice but it should be understood that the invention is not limited to this example.

*Example*

A crude mineral oil from Hanover which has been freed from solid matter by filtration and has a specific gravity of 0.906 at 20° centigrade and an asphalt content (determined by the propane-method) of 30 per cent is passed together with hydrogen under a partial pressure of 600 atmospheres determined by preliminary tests and at a temperature of 430° centigrade over tungsten disulphide prepared according to U. S. Patents Nos. 2,038,599 and 2,039,259, stationarily contained in the reaction vessel. A product is obtained in continuous operation uninterrupted for over one month containing 45 parts of benzine with an end boiling point of 190° centigrade, 40 parts of gas oil with an end boiling point of 340° centigrade and 15 parts of a residual oil, which latter is recycled over the catalyst with fresh crude oil.

This is a very remarkable result with a material of such high asphalt content.

What we claim is:

In a process for the production of valuable hydrocarbon products by treatment of asphalt containing mineral oils with hydrogen gases in the presence of a stationary catalyst at temperatures in the range of 300–500° C., the steps which comprise determining the asphalt content of the oil and then hydrogenating the oil with a partial pressure of hydrogen having the following relation to the asphalt content of the oil: asphalt content of 2%, a minimum hydrogen partial pressure of about 300 to 350 atmospheres; asphalt content of 2 to 10%, a minimum hydrogen partial pressure of about 350 to 420 atmospheres; asphalt content of 10 to 20%, a minimum hydrogen partial pressure of about 420 to 500 atmospheres; asphalt content of 20 to 30%, a minimum hydrogen partial pressure of about 500 to 600 atmospheres, whereby the active life of the catalyst is prolonged.

MATHIAS PIER.
WALTER SIMON.
ERNST DONATH.